United States Patent [19]

Schluderberg

[11] 4,174,123
[45] Nov. 13, 1979

[54] VESSEL PENETRATION APPARATUS

[75] Inventor: Donald C. Schluderberg, Lynchburg, Va.

[73] Assignee: The Babcock & Wilcox Company, New York, N.Y.

[21] Appl. No.: 936,672

[22] Filed: Aug. 24, 1978

Related U.S. Application Data

[60] Division of Ser. No. 626,820, Oct. 29, 1975, Pat. No. 4,124,064, which is a division of Ser. No. 327,349, Jan. 29, 1973, Pat. No. 3,941,187, which is a continuation-in-part of Ser. No. 162,359, Jul. 14, 1971, abandoned.

[51] Int. Cl.² ............................................. F16L 59/14
[52] U.S. Cl. ........................................ 285/47; 138/44; 176/87; 285/138; 285/158; 285/192; 285/286
[58] Field of Search ................. 285/47, 158, 192, 286, 285/138; 138/44; 176/87; 250/358 P

[56] References Cited

U.S. PATENT DOCUMENTS

| 2,031,849 | 2/1936 | O'Leary | 138/44 X |
| 2,203,357 | 6/1940 | Kerr | 285/158 X |
| 3,109,671 | 11/1963 | Braun | 285/47 X |
| 3,240,676 | 3/1966 | Brown et al. | 176/87 X |
| 4,079,967 | 3/1978 | Schoessow | 285/47 |

FOREIGN PATENT DOCUMENTS 1130654 5/1962 Fed. Rep. of Germany ............ 285/47

Primary Examiner—Dave W. Arola
Attorney, Agent, or Firm—Joseph M. Maguire; Angelo Notaro

[57] ABSTRACT

This invention relates to an improved system of providing power having a unique generating means of the nuclear reactor variety adapted with a plurality of steam generators in the form of replaceable modular units of the expendable type for the attainment of the optimum in effective and efficient vaporization of fluid during the process of generating power.

1 Claim, 11 Drawing Figures

FIG. 2
FIG. 3
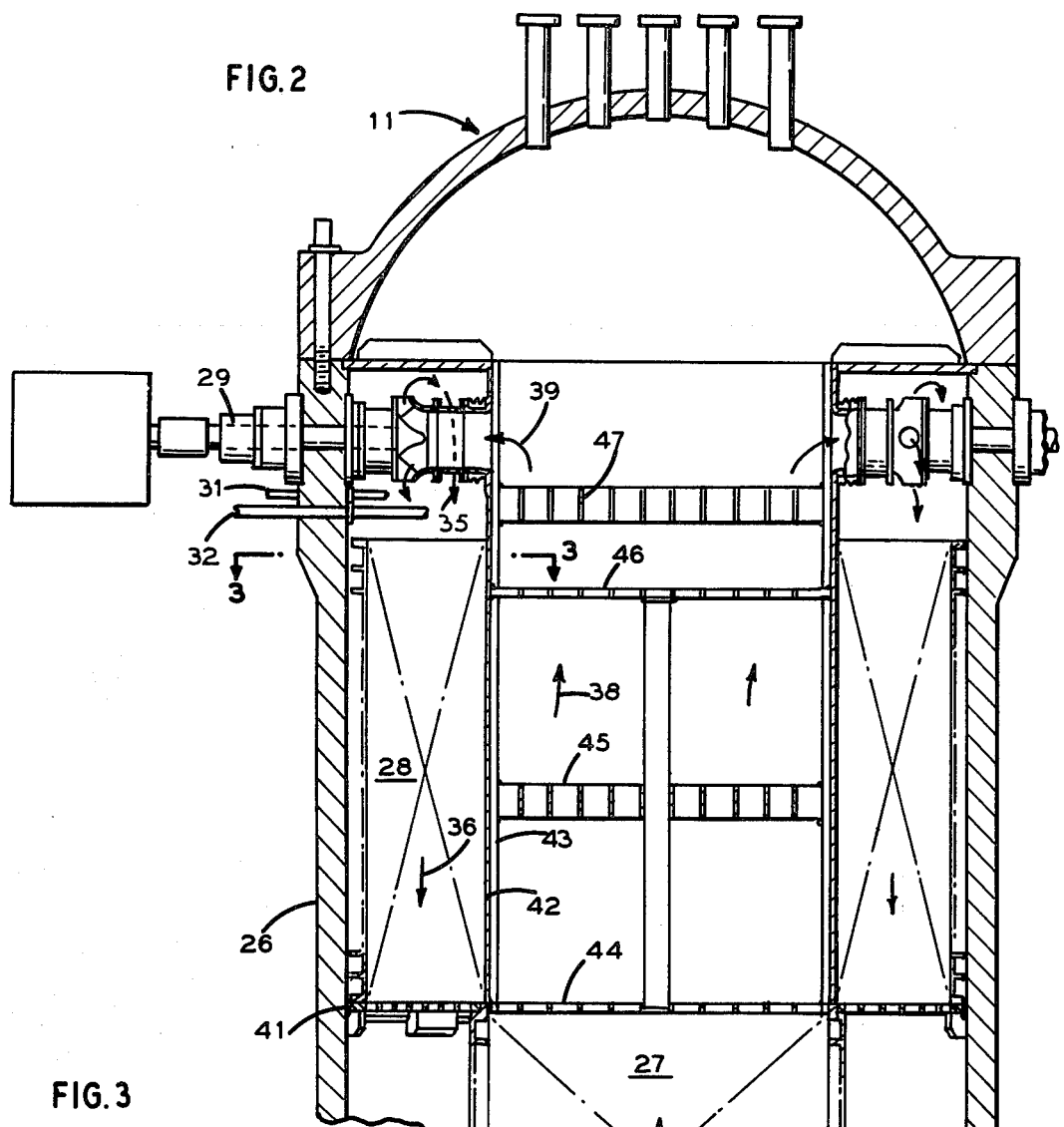
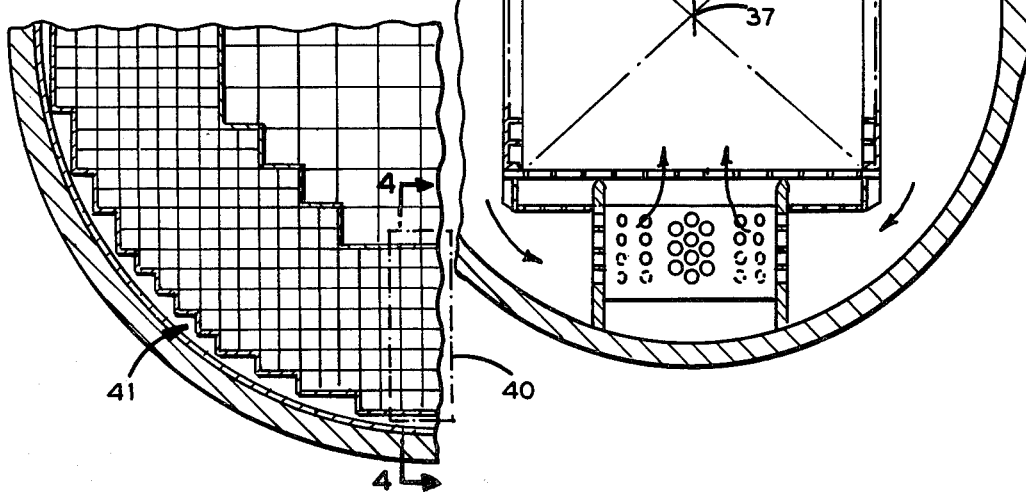

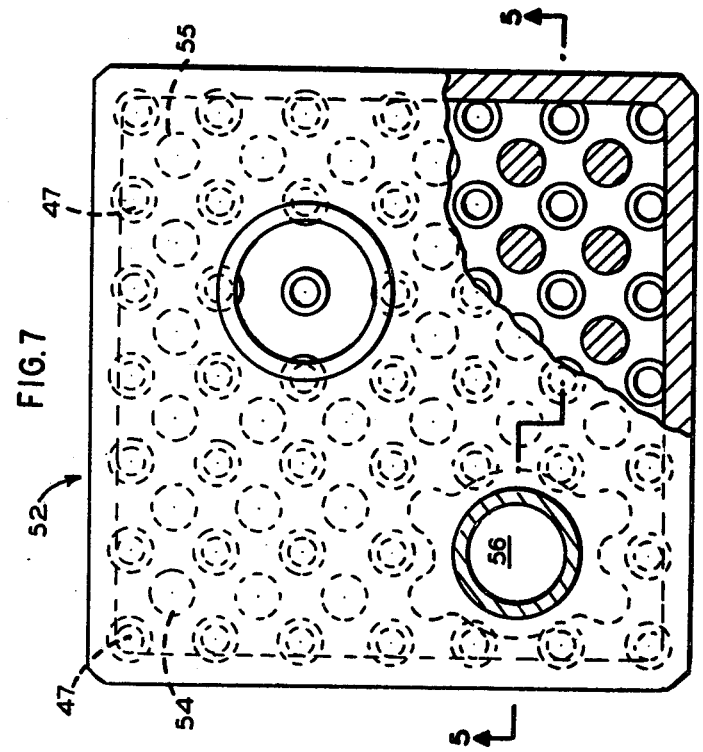
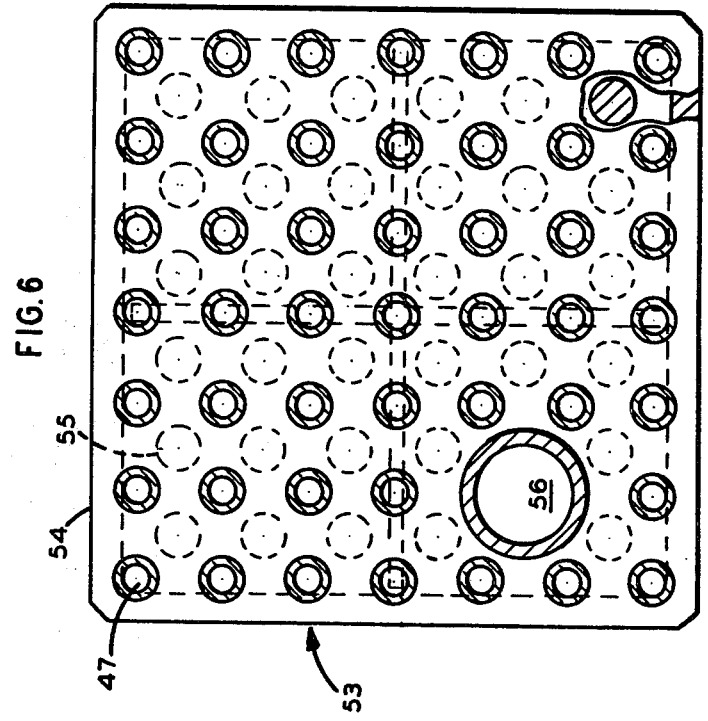

VESSEL PENETRATION APPARATUS

This is a division of application Ser. No. 626,820, filed Oct. 29, 1975; now U.S. Pat. No. 4,124,064 which is a division of application Ser. No. 327,349, filed Jan. 29, 1973, now U.S. Pat. No. 3,941,187; which is a continuation-in-part of application Ser. No. 162,359, filed July 14, 1971 and now abandoned.

In the art, there are many and varied power generating systems of the nuclear variety, some of which depend for their operability on the vaporization of fluids such as water. However, to insure predictability of operativeness, long term life and safety, these generating systems are necessarily required to be assisted with a great many separate and distinct auxiliary systems, each of which has an inherent requirement for space due to their individual size and shape. In the last analysis, the effect of such an operative interweaving web of auxiliary systems is a somewhat large, cumbersome and comparatively inefficient plant in relation to the size of the site required for its installation, maintenance and use.

For instance, in utility applications such as a central power station, the requirements could range in amounts up to 1200 megawatts electrical for the more common unitary nuclear power generators which in the past have usually required as much as about 500,000 square feet of space for maintenance and use. And, if as the ecologists require, such plant were forced to be placed in an underground concrete bed, the same plant would have to be housed at depths as deep as 300 feet. Also, presently in other applications such as marine usage, the speed of a nuclear powered vessel is inherently limited, amongst other factors, by the space available for the power generating system. As of the state of the art at this point in time, the usual nuclear power generating system for maritime usage limits the power output to 325 megawatts thermal as its upper limit primarily due to the overall spacial requirements of the reactor and auxiliary systems. Thus, the drive of such vessel is limited to about 120,000 shp. In effect, as should be apparent, one of the deterrents to the use of nuclear power in many specific applications is the spacial requirements of the plant due not only to the reactor itself but also to the required auxiliary systems.

What is needed in the art is a plant having an arrangement in the form of a power generating system which does not inherently require the use of substantially all of the auxiliary systems of the art for its operation, maintenance and use in an effective and efficient manner accompanied nonetheless by the optimum in the area of safety.

This invention answers the needs of the art relative to the three dimensional requirements of size and shape with special emphasis on a nuclear power generating system which may be used to produce power outputs exceeding those of the art without the necessary use of and, in effect, the substantial elimination of the following auxiliary systems from the arrangement of the present invention, viz (a) drives for partial-length control rods;
(b) core flooding systems;
(c) injection systems of the high pressure variety;
(d) spray systems of a thiosulfate nature;
(e) feed and bleed systems of the soluble poison type;
(f) incore instrumentation systems;
(g) computer systems of enormous size;
(h) liquid waste disposal systems again of large size;
(i) seismic loop support systems;

As an attendant advantage of the elimination of the aforesaid, the periodic testing and maintenance of such auxiliary systems with their inherent requirements of space and cost are also eliminated.

It is therefore an object of this invention to provide an improved system of the nuclear variety for the generation of power without any inherent requirements in the system for the aforesaid auxiliary systems.

Another object is to provide an improved power generating unit of the nuclear variety having provision therein for replaceable steam generators of the expendable modular unit type.

A further object is to provide a steam generator of the modular variety for the attainment of the optimum in effective and efficient vaporization of fluid during the power generating process.

Other objects and many of the attendant advantages of this invention will become more apparent to one skilled in the art from the following detailed description taken with the accompanying drawings, wherein:

FIG. 2 is a cross-sectional view of the reactor of the present invention having a unique arrangement of elements therein;

FIG. 3 is a section taken on line 3—3 of FIG. 2 showing a lattice consisting of a plurality of steam generators around the periphery of the core of the reactor;

FIG. 6 is a view taken on line 6—6 of FIG. 5;

FIG. 7 is a view taken on line 7—7 of FIG. 5;

Similar numerals refer to similar parts throughout the several views.

Figure 1:
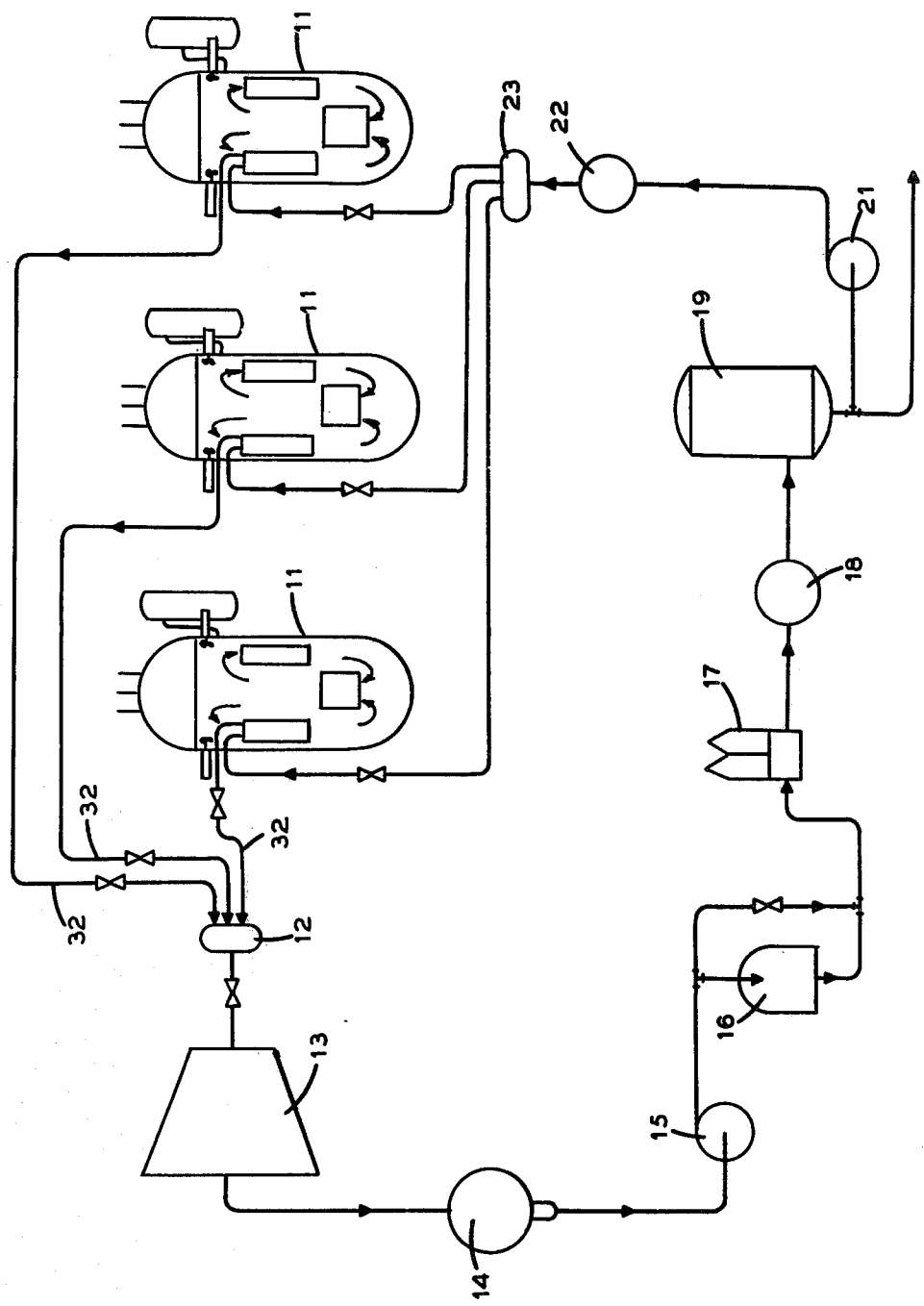
FIG. 1 is a schematic of the flow system of the present invention.

One aspect of the subject invention, as shown in FIG. 1, in the broad sense involves a closed loop power generating system wherein a plurality of steam generating units of the nuclear reactor variety are each connected in parallel to two coupling units which are part of and communicate in series within the closed loop of the system. In accordance with this arrangement, any one or a number of such reactor units may be placed in flow sequence to provide a range of one to three times the power output of the system. For instance, if one unit provides 400 megawatts, the result of placing the three units in parallel operation in the closed loop system would be to supply as much as 1200 megawatts. But, what is not apparent, is that this power output may be accomplished without the auxiliary systems necessitated by the use of the common unitary nuclear reactor of the art having the same overall output.

More specifically, in the system of the present invention, each of the consolidated nuclear steam generators 11 communicates with a coupling unit or mixing chamber 12 with appropriate valving therebetween for the transmission of steam to a turbine 13 for the conventional generation of power. A condenser 14 is in series with the turbine 13 in proximity to a pump 15 for transmission of condensate to a demineralizer 16 and thence in series through an air ejector 17, a low pressure heater 18, and deaerator heater 19. A main pump 21 takes feedwater from the heater 19 and feeds it to a high pressure heater 22 for transmission to the selected nuclear steam generator 11 through a coupling 23 and appropriate valving.

Other attendant advantages of the subject system include the fact that this type complex may be physically located on sites which could not possibly accommodate the conventional unitary nuclear power generating system of comparable output. The safety and siting advantages offered by the subject system far exceed those of other systems utilizing light water reactors, and at the same time, the plant or system is easier to maintain and operate, and produces negligible liquid wastes, besides building up a comparatively lower level of radioactive contamination.

Referring to FIG. 2, the consolidated nuclear steam generator 11 of the present invention is provided with a pressure vessel 26 having a conventional core 27 predominately made of a lattice of fuel elements which define primary coolant flow passageways within the core. A heat exchanger or steam generator 28 is in primary coolant flow communication with the vessel 26 and is provided with means 29 for circulating primary coolant through the generator 28 and vessel 26 via such passageways. The vessel is also provided with means for providing feed water 31 and extracting steam 32 each of such means being coupled to the aforesaid closed loop system as shown in FIG. 1.

The essence of the system and the reactor arrangement is that a unique steam generator is in spaced relationship above the core in the pressure vessel 28. The flow path of the primary coolant is as indicated by points 35 to 39 in FIG. 2. And, as shown, each of the steam generator modular arrangements is provided with a support plate 41 on the bottom thereof and a supporting wall 42 extending longitudinally along the interior of the same which will be hereinafter described in detail.

Previous efforts to develop a pressurized water reactor of the integral variety as shown in FIG. 2 have been complicated by a characteristic incompatibility between the respective shapes and dimensions of major components such as the core, core barrel and steam generator. Each after solving some of the problems of shape to provide a more compact reactor, it was found that the arrangements of the art increased manufacturing costs and added problems associated with maintenance and in-service inspection. Therefore, a reactor arrangement such as that shown in FIG. 2 was sought in order to provide the desired degree of compactness but with the avoidance of the added cost and inspection problems.

Improved compactness has been realized with the arrangement shown in FIG. 2 because of the steam generator 28 and its inherent shape and size. As a result, the height and diameter of the pressure vessel both were dramatically reduced with a corresponding reduction in primary coolant inventory to as little as 50 percent of that required by the conventional unitary reactors of the art and the subject arrangement is relatively free of thermal stresses caused by operating transients.

Other attendant advantages are that steam generators are in spaced relationship above the core. In practice, the space should be at least about 24 inches in total extent. In this manner, the production of radioactive oxygen is avoided in the secondary system with its attendant problems which include the use of expensive shielding throughout such system. Also, as an added advantage, activated corrosion products are also avoided in the secondary system. In the past, this usually occured when the metallic tubing came in contact with a neutron flux from the reactor core. As a result of the aforesaid advantages, ferritic steel may be utilized in the fabrication of the steam generator which is comparatively cheaper and which possesses a thermal conductivity greater than that of stainless steel for the optimization of the efficiency of the heat exchange process. In the past, the use of such material was not possible. This was primarily because as the distance between the steam generator and the core decreases, the usual tendency of the ferritic steels to crack and fail is increased. Also, as in the past, when auxiliary systems were used which contain boric acid in the primary coolant, the corrosion rate of the ferritic steels prohibited its use. Now however, such material may be used and due to the greater thermal conductivity of such materials, the steam generators may be fabricated in smaller and cheaper units without having any compromising effect on the overall required heat transfer of such unit. Further, if as in the past, the steam generator were adjacent to the core, the steam flow path would present substantial technical, operational and maintenance problems. However, now, with the arrangement shown in FIG. 2, there is a relatively low resistance to flow in the primary system and a natural circulation path is maintained even though the pump 29 fails to operate. In fact, the circulation of the subject reactor in such case would be somewhat more intensified than that of the natural overall circulation or flow ordinarily encountered in reactors of the art. Thus, unusually good performance in this respect is encountered even with inoperative circulating pumps.

In the present invention, the heat exchangers or steam generating units 28 for use in the reactor assembly are in the form of a plurality of separate and replaceable modular units each of which are expendable and the total of which control the heat transfer process of the system and, as described, the flow distribution of the coolant through such unit. As is apparent from the art, the output of a nuclear reactor is limited, amongst other factors, by the rate at which heat can be transferred to the secondary fluid flowing within the heat exchanger.

One structural form for providing the optimum in effective and efficient heat transfer between a primary and secondary fluid within the aforesaid reactor is that in which a plurality of elongated heat exchange tubes containing a secondary fluid are packaged within a prescribed volumetric area in a definite array in the flow path of the heated primary fluid. The primary fluid in such a case flowing in a downwardly direction over a maximum surface of the exterior area of the tubes, transferring its heat to the secondary fluid within each of the tubes, and such secondary fluid being easily vaporized producing steam or gas. The latter vapor will then flow in a countercurrent or upwardly direction within such tubes relative to the flow of the primary fluid. To provide the optimum to the system relative to heat transfer, the bundles of tubes are fabricated in groups 40 called modular units, which are positioned in adjacent relation around the periphery of the core as shown in FIG. 3 in the overall form of a lattice 41.

The specific lattice shown in FIG. 3 cosists of a plurality of uniformly constructed, elongated and longitudinally contiguous assemblies of individual steam generating units.

Figure 4:
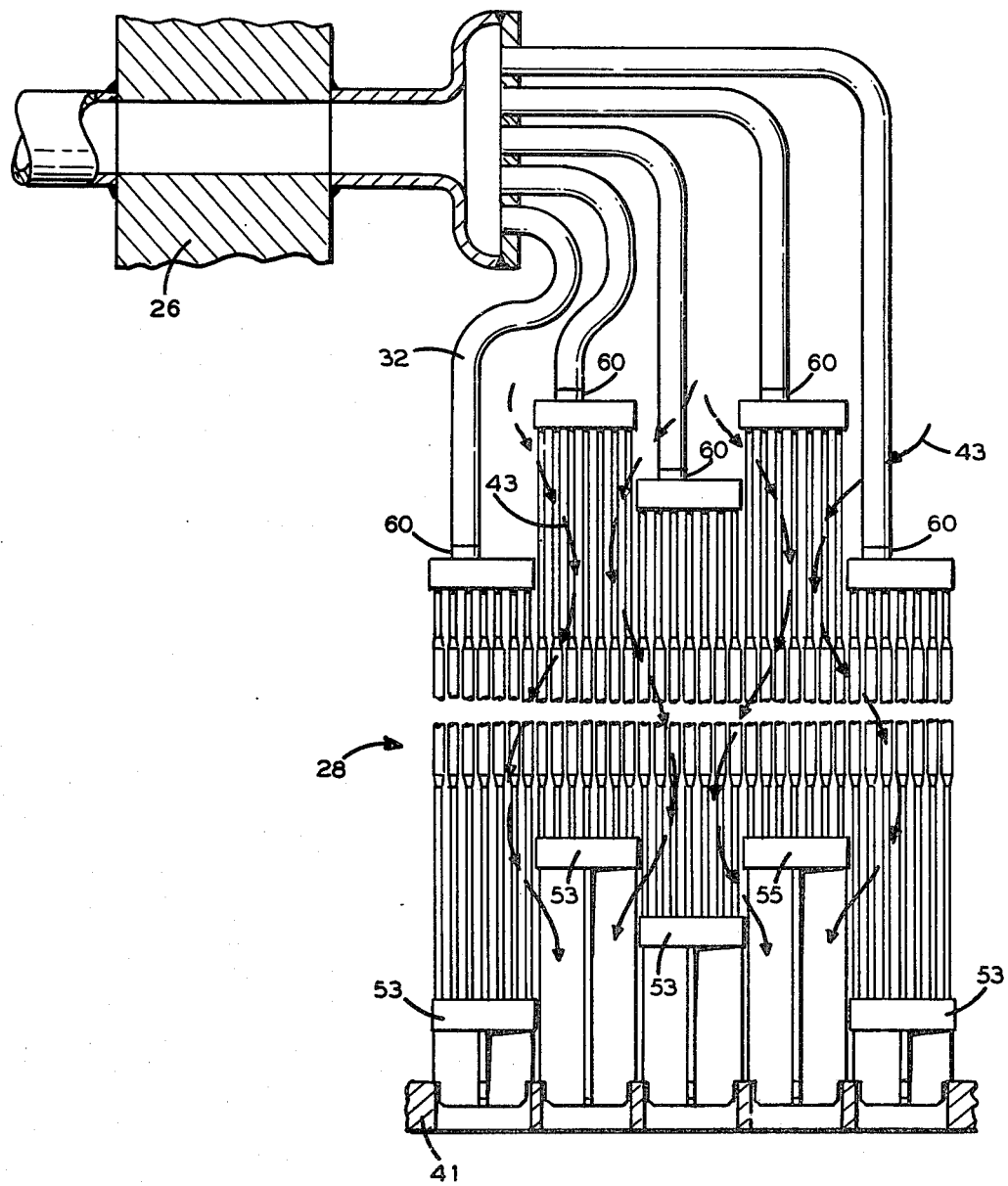
FIG. 4 is a view taken on line 4—4 of FIG. 3 showing an overall grouping of a number of the individual modular steam generators of the reactor.

However, the overall configuration of the lattice may be somewhat varied in arrangement without departing from the spirit of this invention as long as each of the steam generators 28 which make up the lattice 41 is an individual modular unit of the separable and replaceable variety hereinafter more fully described. Further, as shown in FIG. 4 to provide integrity to the free-flowing nature of the primary fluid through the lattice or overall steam generator assembly, the individual groupings 42 of the steam generators are positioned at varying elevations relative to one another providing a substantial degree of unobstructed flow for the primary fluid into, through and out of the steam generator assembly as shown by flow lines 43. A system of manifolds 44, as shown, are provided to transfer the steam from the modular groupings through the wall of the vessel 26 to conduits 32 of the overall power generating system as shown in FIG. 1. It should be noted that the enlarged portions of each of the individual tubings 47 are positioned in lateral array relative to each other across the center of the modular groupings 42 even though each of the steam generating units of the grouping are positioned at varying elevation. In effect, the entire assembly of steam generators form a plurality of longitudinal flow channels for the primary fluid. Although the modules are positioned at different elevations, the central unswaged portion of the individual swaged tube lengths are positioned at the same elevation for all modules. This arrangement maintains the effectiveness of the heat transfer surface by avoiding a tendency for bypassing of any individual tube by the flowing primary fluid.

Figure 5:
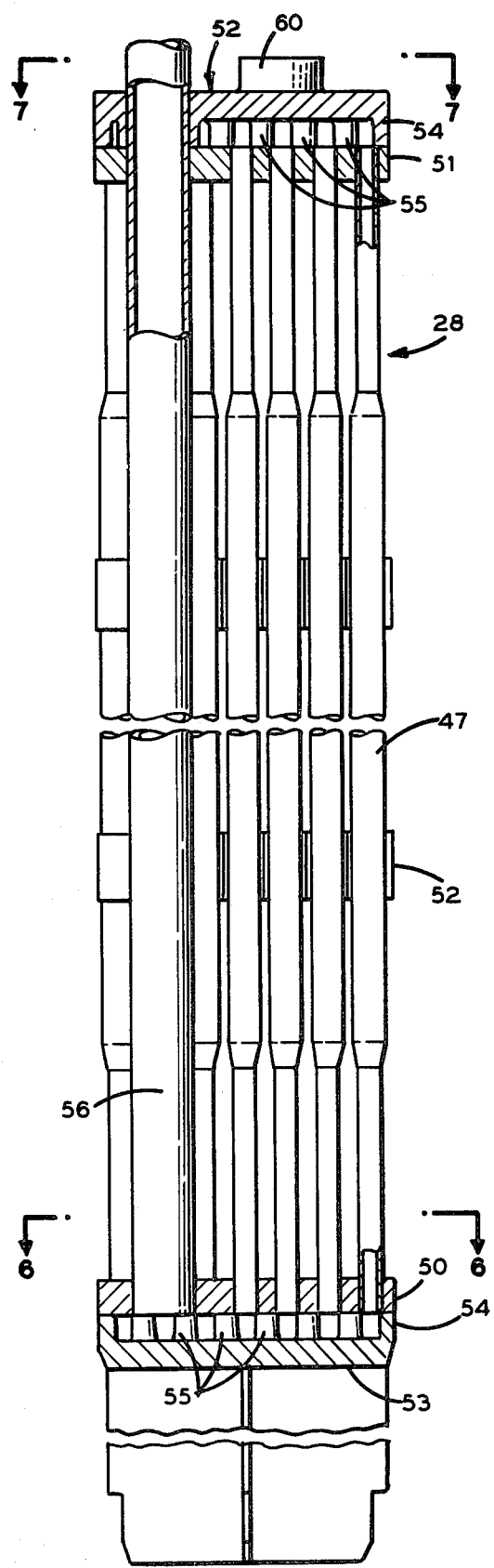
FIG. 5 is a view of an individual modular steam generator of the reactor of FIG. 2.

As shown in FIG. 5, the individual modular unit or separate steam generating unit 28 are essentially a unitary package of elongated tubes 47A accurately located and retained in position relative to each other with reasonable freedom therebetween to expand with temperature change. The bundle of longitudinally extending tubes are stably supported between two tube sheets, 50, 51 each of which form the basis, in conjunction with other elements, for the inlet and outlet header of the unitary system and which maintain the bundle from chatter and vibration when the unit is subject to a heated turbulent flowing primary fluid. In general, the unit is laterally stabilized at intervals along its length by a structural unit called a grid 52. The latter eliminates the risk of bowing or displacement of the individual tubes as a result of temperature change or turbulent flow. In some instances, the grip could be formed by a plurality of interfitting straps to provide a lateral structural network of openings for the reception and maintenance of the longitudinal tubes in position in a lattice type configuration without obstruction of flow of the primary fluid over the individual tubes. As indicated, the latter fluid flows longitudinally along and among the tube assembly as a vehicle for heat or energy transfer to the individual tubes.

As shown in FIG. 5, the individual relatively thin vertical tubes extend through both the upper and lower horizontal tubesheets side by side at predetermined distances from one another. The outer face of either of the tubesheets or laterally joining means are preferably of a flat planar nature at the points of contact of such tubesheets with the terminal ends of the individual tubes. In effect, as described, the unit represents a compact package of nested tubes. The methods of fastening or securing such tubes to tubesheets are numerous and include beam-welding or any other common or conventional method of the art for such desired purpose.

A further advantage, as shown in FIG. 2, is the improved accessibility of the steam generator section 28 in the reactor itself due to the ability to remove the entire interior structure located above the core as a unit. The latter unit being constructed of outer walls 42A which support the steam generator and are braced longitudinally by stiffening ribs 43A which in turn are vertically supported by plates. After the interior unit described is removed, access may be easily accomplished to the invidivual groupings of the steam generators. In this manner, each of the modular units may be either easily replaced, expended, or ever repaired in situ. Also, on a comparative basis, relative to the art of record, less time is required to fully remove and replace each of the steam generating modular units. Also, tube leaks in the individual tubes in a modular unit may be easily isolated with less loss of capacity on a comparative basis.

In a preferred embodiment, the modules would have a square cross-section and a pitch compatible with the core fuel assembly size and pitch. In essence, the once through steam generator with its low secondary velocities and upward flow was found to be uniquely adapted to the modular form required. Preferably, the individual tubes of the modular unit have a wall thickness of about 0.067 inches and body portion with an outside diameter of about 0.50 inches terminating at either end in a swaged manner to an outside diameter of about 0.370 inches. The pitch in a practical unit is about a 0.611 inch square. Primary coolant flow in and out of each of the modular units is facilitated by the swaged tube section. And, the characteristically small tube diameter of the modular units reduces the leak rate resulting from a tube failure, and contributes to compactness besides minimizing the requirement for thick walls for the tubes themselves.

The individual headers 52, 53 as shown in FIGS. 6 and 7 are either of a forged or cast nature. These individual pieces are welded to the tubesheet into the position shown in FIG. 5. Each of the headers is provided with a peripheral border 54 which is engaged to the tubesheet. The interior of the main body section of each of the headers is supported against the external pressure load of the primary fluid by a plurality of uniformly spaced columns 55 which rest against the tubesheet when the border is welded into position. Since the internal pressure is considerably lower than the external pressure, it is not necessary to weld each of these columns at the contact surface of the tubesheet.

Preferably, the steam generator modules are manifolded in groups of nine and ten. And, as previously shown, are located in at least three vertical positions relative to each other to allow unrestricted flow of the primary fluid. Also, each module is free to expand or contract vertically during operating transients by virtue of the flexibility in the manifold piping itself. Further, the penetrations of the vessel for feedwater leads and steam outlets are generally symetrical in each quadrant of the vessel.

In operation, primary water flows longitudinally downward over the steam generator tubes at about the same velocity as that existing in the core. Also, feedwater or the secondary fluid is provided by the inlet feed to the feedwater tube 56. The feedwater then flows downwardly to the lower module header and is dispersed in a uniform pattern from the lower header into each boiler tube and is evaporated and superheated as it flows vertically upward through tubes 47 to be collected in the upper header through the opening 60 to the manifolds of the power generating unit of the system. Experimental results have shown that the modular steam generator will be free of critical or unusual stability problems with or without swaging of the individual boiler tubes.

In the system heretofore described, tube leaks may be isolated without interrupting plant operation. Under compression, the tube walls of the generator are less affected by defects and less subject to stress corrosion cracking. The tubes can operate at lower stresses and should not leak even if they collapse. Also, the individual steam generators do not require the special shop facilities that a conventional unit requires. Thus, the modular unit is well adapted to mass production techniques not previously applicable to the manufacture of steam generators of the pressurized water variety.

The extreme compactness of the system heretofore described relative to output, result in significant savings for such applications as the manufacture, maintenance, and use of a central power station. In addition, there are fewer and less elaborate auxiliary and safety systems required by such a system which tend to increase the expense of an ordinary conventional system.

Figure 8:
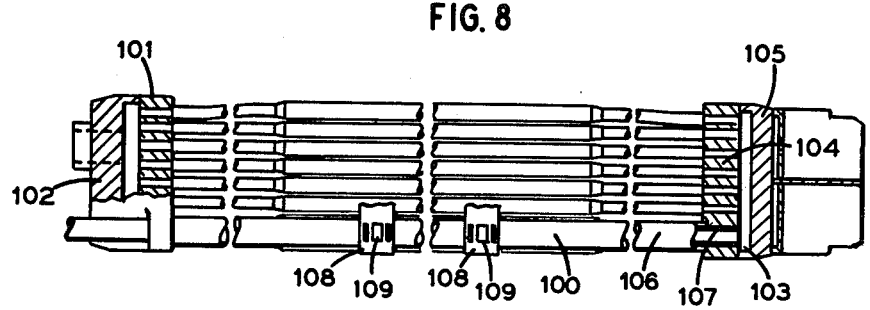
FIG. 8 is a side elevation in broken section of another heat exchanger that embodies principles of the invention.

A further embodiment of the invention, shown in FIG. 8, includes a shrouded feedwater inlet tube 100 that penetrates, in a sliding relationship, the tube sheet 101 and the steam outlet header 102 to establish fluid communication with a feedwater inlet chamber 103 that is formed between an inlet tube sheet 104 and a feedwater header 105. It has been found that a shroud 106 inhibits steam formation within an inwardly disposed, concentrically positioned feed tube 107. This feature of the invention serves to control possible instabilities in steam generation and fluid flow within the heat exchanger module.

As shown in the drawing, the shroud 106 is confined in recesses that are formed in the surfaces of the tube sheets 101 and 104. The feed tube 107, in contrast, passes through penetrations formed in both of the tube sheets. The feed tube 107, moreover, is firmly secured in the tube sheets through belling, welding, or the like.

An additional feature of the invention is provided by spacer grids 108. These grids, of a type that is described for example in U.S. patent application Ser. No. 207,255 filed on Dec. 13, 1971, by Felix S. Jabsen are provided with resilient detents 109 that protrude inwardly toward the tubing that forms the heat exchanger. The detents engage the surfaces of heat exchanger tubes with sufficient force to inhibit tube vibration at high flow velocities. Thus, for instance, in conventional heat exchangers the flow velocity of the fluid outside the heat exchanger tubing is limited to about five feet per second. At higher velocities tube vibrations commence that tend to promote failures and, in general, shorten the life of the heat exchanger. With the Jabsen spacer grids, however, the flow velocity can be increased by a factor of at least three, to a velocity of not less than fifteen feet per second without generating appreciable vibration or shortened module life.

The grids 108 can be secured to the tubes in the bundle through inserting and rotating keys (not shown) that temporarily move the detents 109 away from the tubes during assembly before positioning the grid on the tubes. In this way, the deflected detents protect the tubes from scratching and marring. Clearly, heat exchanger assembly is made less expensive through the application of this technique that is described in the aforementioned Jabsen patent application in connection with fuel element assembly. After the grids are properly positioned on the heat exchanger tubes, the keys are once more rotated and then withdrawn from the grid and heat exchanger assembly.

Figure 9:
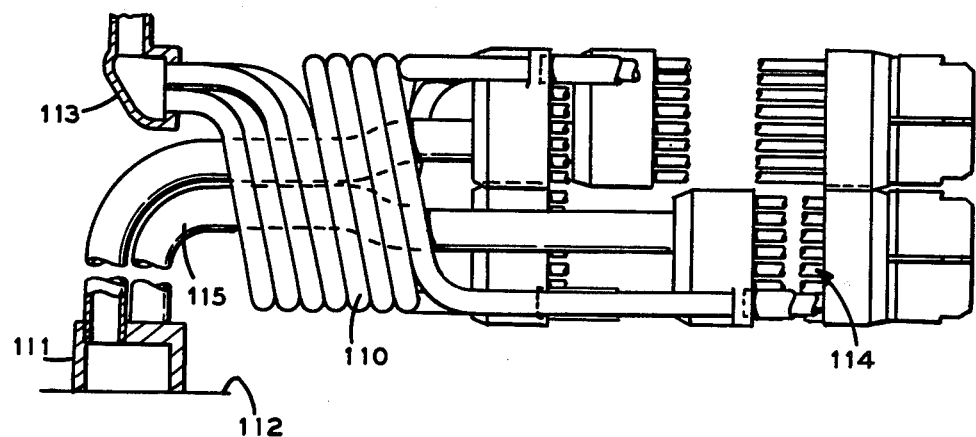
FIG. 9 is a side elevation of still a further heat exchanger that embodies principles of the invention.

An additional embodiment of the invention is shown in FIG. 9. Typically a steam manifold 111 is attached directly to the inside wall 112 of the reactor pressure vessel. A feed manifold 113, however, is spaced directly above the heat exchanger module group 114. Coiled feedwater manifold tubing 110 between the header 113 and the individual modules in the group 114 allow for differential expansion of the tubing with respect to the module, internal steam manifolding 115 and the pressure vessel.

In passing, it should be noted that modular groups 114 close to the pressure vessel wall are supported largely through the tubes that comprise the internal steam manifolding, rather than on the support plate 41 shown in FIG. 1.

Figure 10:
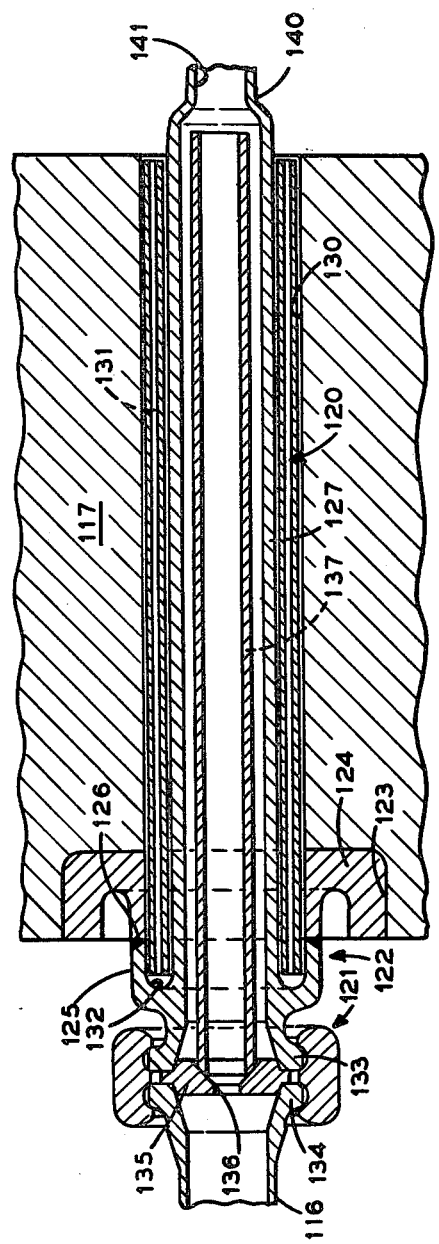
FIG. 10 is a side elevation in full section of a reactor pressure vessel feedwater penetration.

As shown in FIG. 10, an inlet feed line 116 external to reactor pressure vessel 117 must penetrate the vessel in order to deliver fresh feedwater to the heat exchanger modules. Because the incoming feedwater is relatively cold, in contrast to the higher temperature thick-walled reactor pressure vessel, not only is there a risk of initiating boiling in the water that flows through the inlet, but there also is a risk of establishing inacceptably high stresses within the reactor vessel wall because of temperature related differences in the expansion of the metal in the vessel that is adjacent to and spaced from the cold feedwater inlet.

In order to cope with this problem feedwater inlet penetration apparatus 120, built in accordance with the invention has a fluid-tight clamp 121, for example, a "Grayloc" clamp, to join the inlet feed line 116 to a nipple 122 that is formed in the outer surface of the pressure vessel 117. Illustratively, the nipple 122 is formed by boring out a recess 123 in the vessel surface and filling this recess with a "puddle weld" 124 of inconel that is machined to provide the re-entrant shape shown in FIG. 10 of the drawing. A fitting 125 that matches a prepared surface 126 on the machined puddle weld 124 is joined to this surface through a further weld, or the like.

The fitting 125 also has a long tube 127 that protrudes through a penetration 130 that is formed in the reactor vessel 117. The tube 127 is much longer than the encircling part of the fitting 125 that is joined to the prepared surface 126 of the machined puddle.

The tube 127 extends through the penetration 130 to the inner wall of the vessel 117. The tube 127, moreover, is concentric with and spaced from the surface of the penetration. A sleeve 131 of insulating material, e.g. several laminations of metal foil insulation, is lodged in the annulus that is formed between the penetration 130 and the tube 127. The sleeve 131 extends from the inner wall of the vessel 117 to a slight distance beyond the plane of the vessel's outer wall in order to nest within a recess 132 that is formed in the fitting 125 in order to serve as a thermal barrier between the vessel and the feedwater.

The fitting 125 terminates in a flange 133 that is outside of the plane of the outer vessel wall. Another similar, albeit oppositely disposed, flange 134 terminates the inlet feed line 116 and is in alignment with the flange 133. The flanges 133 and 134 are separated by means of an interposed seal 135 that has an orifice 136 concentric with the line 116 and the tube 127. This orifice, it has been found, provides improved feedwater flow stability.

A tubular thermal shield 137 is secured to the concave surface of the orifice. The shield 137, moreover, is concentric with and extends through the tube 127 in order to protrude beyond the inner wall of the vessel 117. A welding head (not shown) penetrates the interior of the tube 127 from the outer surface of the vessel 117 and completes the weld at the piece 140 from the interior of the tube 122. In a similar manner a cutting tool also can be introduced to cut the weld at the piece 140 and facilitate the removal of the penetration apparatus 120, to be followed by the insertion of a new apparatus.

The feedwater inlet penetration apparatus 120 terminates within the reactor vessel in a transition piece 140 that is formed by upsetting the end of a feedwater line 141 and welding the upset end to the terminal surface of the tube 127.

Thus, there is provided a pressure vessel feedwater penetration apparatus that promotes flow stability by forestalling the onset of boiling within the feedwater tubing through the thermal shield 137. The thermal shield also incorporates the flow-stabilizing benefits of the orifice 136. This advantageous feature of the invention is further enhanced through the clamp 121 that joins the feed line 116 to the penetration apparatus 120. The clamp can be removed with relative ease to aid inspection or to replace failed tubing as the need arises. Thus, inspection and preventitive maintainence become much less expensive and troublesome with the concept of the modular heat exchanger than with the usual designs that are characterized by a few large welded ducts and pipes. A like apparatus can be used for steam penetrations. It also should be noted that to improve corrosion resistance under primary water conditions the entire internal surface of the vessel 117 should be clad with inconel, stainless steel or some other suitable material. The surface of the penetration 130, moreover, should in this case be lined with a similar corrosion resistant cladding.

Figure 11:
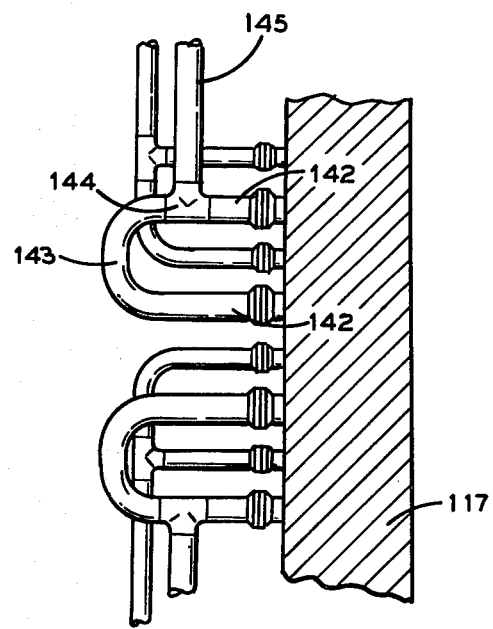
FIG. 11 is a side elevation of a portion of a reactor pressure vessel that displays additional principles of the invention.

Turning now to FIG. 11, a pair of steam inlet penetration apparatuses 142 are joined together in a return bend 143. The combined flow to the return bend 143 then flows through a tee 144 that is coupled to a manifold 145. Enhanced safety is one of the salient characteristics of this feature of the invention. For instance, in the event of a line failure, the high pressure of the steam ordinarily would cause the free end of the parted line to whip about and spray hot, pressurized steam about the plant.

In the event one of the lines coupled to the return bend 143 parts, however, the unbroken line will tend to restrain the otherwise unrestricted movement of the parted tube, thereby reducing the aforementioned hazards associated with an unsecured tube. Naturally, a similar advantage obtains through the use of a return bend in connection with feedwater manifolds.

A further advantage that attends the modular heat exchanger design herein described is the opportunity for extensive use of relatively small diameter tubing. Thus, tubing within the realtor vessel 117 of a diameter that is relatively large, of more than one inch (iron pipe size, drips), for example, must satisfy very stringent safety code tests. Smaller diameter tubing of the sort that is used extensively in the practical application of this invention need not satisfy such rigorous test requirements. In a similar manner piping external to the reactor and exposed to the atmosphere that has a diameter of four inches IPS or less, need not satisfy such difficult and expensive test standards. As a consequence, the extensive use of small diameter tubing significantly reduces inspection costs without impairing the safety of the system.

The embodiments of the invention in which an exclusive property or privilege is claimed are defined as follows:

1. A reactor pressure vessel penetration apparatus for feedwater delivery comprising an inlet feedwater line external to the pressure vessel, a flange formed on the end of the feedwater line that is adjacent to the pressure vessel, a nipple protruding from the pressure vessel surface, means for joining the feedwater line and the nipple, said nipple having a flange formed on the end thereof oppositely disposed to and in axial alignment with the feedwater line flange, a plate having an orifice formed in the center thereof interposed between the flanges, a thermal shield secured to the orifice plate and having an axis that is in general alignment with the orifice, said thermal shield protruding through the pressure vessel, a tube formed on the nipple flange and in axial alignment therewith extending through the pressure vessel in axial alignment about the thermal shield, and a sleeve of several laminations of reflective thermal insulation interposed in an annulus that is formed between the pressure vessel and the tube.

* * * * *